United States Patent
Assael et al.

(10) Patent No.: US 12,211,488 B2
(45) Date of Patent: Jan. 28, 2025

(54) ADAPTIVE VISUAL SPEECH RECOGNITION

(71) Applicant: DeepMind Technologies Limited, London (GB)

(72) Inventors: Ioannis Alexandros Assael, London (GB); Brendan Shillingford, London (GB); Joao Ferdinando Gomes de Freitas, London (GB)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 18/571,553

(22) PCT Filed: Jun. 15, 2022

(86) PCT No.: PCT/EP2022/066419
§ 371 (c)(1),
(2) Date: Dec. 18, 2023

(87) PCT Pub. No.: WO2022/263570
PCT Pub. Date: Dec. 22, 2022

(65) Prior Publication Data
US 2024/0265911 A1    Aug. 8, 2024

(30) Foreign Application Priority Data
Jun. 18, 2021    (GR) .............................. 20210100402

(51) Int. Cl.
*G10L 25/30*    (2013.01)
*G10L 15/06*    (2013.01)

(52) U.S. Cl.
CPC ............ *G10L 15/063* (2013.01); *G10L 25/30* (2013.01)

(58) Field of Classification Search
CPC .............................. G10L 15/063; G10L 25/30
(Continued)

(56) References Cited

U.S. PATENT DOCUMENTS 10,740,596 B2 *   8/2020  Yu ........................ G06V 40/166
2008/0294986 A1   11/2008  Seo et al.
(Continued)

FOREIGN PATENT DOCUMENTS

CN    111723758 A  *  9/2020  ......... G06K 9/00335
CN    112041924         12/2020
(Continued)

OTHER PUBLICATIONS

T. Makino et al., "Recurrent Neural Network Transducer for Audio-Visual Speech Recognition," 2019 IEEE Automatic Speech Recognition and Understanding Workshop (ASRU), Singapore, 2019, pp. 905-912, doi: 10.1109/ASRU46091.2019.9004036. keywords: {Videos; Visualization; Speech recognition; YouTube; Feature (Year: 2019).*

(Continued)

*Primary Examiner* — Bharatkumar S Shah
(74) *Attorney, Agent, or Firm* — Fish & Richardson P.C.

(57) ABSTRACT

Methods, systems, and apparatus, including computer programs encoded on computer storage media, for processing video data using an adaptive visual speech recognition model. One of the methods includes receiving a video that includes a plurality of video frames that depict a first speaker; obtaining a first embedding characterizing the first speaker; and processing a first input comprising (i) the video and (ii) the first embedding using a visual speech recognition neural network having a plurality of parameters, wherein the visual speech recognition neural network is configured to process the video and the first embedding in accordance with trained values of the parameters to generate a speech recognition output that defines a sequence of one or more words being spoken by the first speaker in the video.

20 Claims, 3 Drawing Sheets

(58) Field of Classification Search
USPC .......................................................... 704/200
See application file for complete search history.

(56) References Cited

U.S. PATENT DOCUMENTS

| | | | |
|---|---|---|---|
| 2010/0185445 | A1 | 7/2010 | Comerford et al. |
| 2019/0232974 | A1* | 8/2019 | Reiley .................. G06V 40/168 |
| 2019/0341058 | A1 | 11/2019 | Zhang et al. |
| 2020/0117887 | A1* | 4/2020 | Chaudhuri .............. G10L 25/78 |
| 2021/0065712 | A1* | 3/2021 | Holm ...................... G10L 15/02 |
| 2021/0118427 | A1 | 4/2021 | Braga |
| 2021/0183391 | A1* | 6/2021 | Lin ........................... G06T 7/50 |

FOREIGN PATENT DOCUMENTS

| | | | |
|---|---|---|---|
| CN | 112639964 | | 4/2021 |
| CN | 112889108 A * | | 6/2021 .......... G06K 9/00335 |
| EP | 03010015 | | 4/2016 |
| JP | 2011014985 | | 1/2011 |
| JP | 2019204147 | | 11/2019 |
| JP | 2021009571 | | 1/2021 |
| JP | 2021086274 | | 6/2021 |
| KR | 1020160043836 | | 4/2016 |
| WO | WO 2019/219968 | | 11/2019 |

OTHER PUBLICATIONS

F. Tao and C. Busso, "Gating Neural Network for Large Vocabulary Audiovisual Speech Recognition," in IEEE/ACM Transactions on Audio, Speech, and Language Processing, vol. 26, No. 7, pp. 1290-1302, Jul. 2018, doi: 10.1109/TASLP.2018.2815268. keywords: {Hidden Markov models; Speech; Visualization; Feature (Year: 2018).*

T. Makino et al., "Recurrent Neural Network Transducer for Audio-Visual Speech Recognition," 2019 IEEE Automatic Speech Recognition and Understanding Workshop (ASRU), Singapore, 2019, pp. 905-912, doi: 10.1109/ASRU46091.2019.9004036. keywords: {Videos; Visualization; Speech recognition; YouTube; Featu (Year: 2019).*

F. Tao and C. Busso, "Gating Neural Network for Large Vocabulary Audiovisual Speech Recognition," in IEEE/ACM Transactions on Audio, Speech, and Language Processing, vol. 26, No. 7, pp. 1290-1302, Jul. 2018, doi: 10.1109/TASLP.2018.2815268. keywords: {Hidden Markov models; Speech; Visualization; Featu (Year: 2018).*

Allowance of Patent in Korean Appln. No. 10-2023-7032681, dated Jan. 30, 2024, 4 pages (with English translation).

Kandala et al., "Speaker Adaptation for Lip-Reading Using Visual Identity Vectors," Interspeech 2019, Sep. 15-19, 2019, pp. 2758-2762.

Margam et al., "LipReading with 3D-2D-CNN BLSTM-HMM and word-CTC models," CoRR, Jun. 25, 2019, arxiv.org/abs/1906.12170, 5 pages.

Office Action in Canadian Appln. No. 3,214,170, dated Jan. 29, 2024, 4 pages.

Assael et al., "LipNet: End-to-End Sentence-Level Lipreading," CoRR, Nov. 5, 2016, arXiv:1611.01599, 13 pages.

International Search Report and Written Opinion in International Appln. No. PCT/EP2022/066419, dated Oct. 18, 2022, 13 pages.

Makino et al., "Recurrent Neural Network Transducer for Audio-Visual Speech Recognition," 2019 IEEE Automatic Speech Recognition and Understanding Workshop (ASRU), Dec. 14-18, 2019, 8 pages.

Shillingford et al., "Large-Scale Visual Speech Recognition," CoRR, Jul. 13, 2018, arxiv.org/abs/1807.05162, 21 pages.

Office Action in Australian Appln. No. 2022292104, dated Jul. 17, 2024, 3 pages.

Office Action in Chinese Appln. No. 202280025056.5, dated Mar. 25, 2024, 12 pages (with English translation).

Office Action in Japanese Appln. No. 2023-560142, dated Apr. 30, 2024, 8 pages.

Office Action in Chinese Appln. No. 202280025056.5, dated Sep. 11, 2024, 8 pages (with English translation).

Office Action in Japanese Appln. No. 2023-560142, dated Sep. 2, 2024, 10 pages (with English translation).

* cited by examiner

ADAPTIVE VISUAL SPEECH RECOGNITION

CROSS-REFERENCE TO RELATED APPLICATIONS

This application is a National Stage Application under 35 U.S.C. § 371 and claims the benefit of International Application No. PCT/EP2022/066419, filed Jun. 15, 2022, which claims the benefit of priority to Greek application No. 20210100402, filed Jun. 18, 2021, the entirety of which is incorporated herein by reference.

BACKGROUND

This specification relates to visual speech recognition neural networks.

Neural networks are machine learning models that employ one or more layers of nonlinear units to predict an output for a received input. Some neural networks include one or more hidden layers in addition to an output layer. The output of each hidden layer is used as input to the next layer in the network, e.g., the next hidden layer or the output layer. Each layer of the network generates an output from a received input in accordance with current values of a respective set of parameters.

One example of a neural network is a visual speech recognition neural network. Visual speech recognition neural networks decode speech from the movement of a skeaper's mouth. In other words, visual speech recognition neural networks take video of a speaker's face as input and generate as output text that represents the words that are being spoken by the speaker depicted in the video.

One example of a visual speech recognition neural network is a LipNet. LipNets were initially described in Assael et al., *LipNet: End-to-End Sentence-Level Lipreading*, in arXiv preprint arXiv: 1611.01599 (2016), available at arxiv.org. A LipNet is a deep neural network that maps a variable-length sequence of video frames to text, making use of spatiotemporal convolutions and a recurrent neural network.

Another example of a visual speech recognition neural network is described in Shillingford et al., *Large-Scale Visual Speech Recognition*, in arXiv preprint arXiv: 1807.05612 (2018), available at arxiv.org. *Large-Scale Visual Speech Recognition* describes a deep visual speech recognition neural network that maps lip videos to sequences of phoneme distributions and a speech decoder that outputs sequences of words from the sequences of phoneme distributions generated by the deep neural network.

SUMMARY

This specification describes a system implemented as computer programs on one or more computers in one or more locations that can generate a sample-efficient and adaptive visual speech recognition model. In this context, being sample-efficient and adaptive means that the model can be customized to recognize the speech of a new speaker with far less training data than was used to train the adaptive model. For example, while training the adaptive model may require hours of video recordings for each individual speaker, adapting the model for a new speaker may require only a few minutes of video recordings of the new speaker.

A training system can train the visual speech recognition model using a plurality of embedding vectors for respective individual speakers and a visual speech recognition neural network. Because of the computationally intensive nature of the training process, the training can be performed by a distributed computing system, e.g., a datacenter, having hundreds or thousands of computers.

The output of the training process is an adaptive visual speech recognition model that can be efficiently adapted to a new speaker. Adapting the model generally involves learning a new embedding vector for the new speaker, and may optionally involve fine-tuning the parameters of the neural network for the new speaker. The adaptation data can be only a few seconds or a few minutes of video of the new speaker and corresponding transcriptions for the text. For example, the video may be a video of the speaker while the speaker speaks the text on a text prompt that is being presented to the user on a user device.

The adaptation process is therefore much less computationally intensive than the original training process. Thus, the adaptation process can be performed on much less powerful hardware, e.g., a mobile phone or another wearable device, a desktop or laptop computer, or another internet-enabled device installed in a user's home, to name just a few examples.

In one aspect, a method includes receiving a video that includes a plurality of video frames that depict a first speaker; obtaining a first embedding characterizing the first speaker; and processing a first input comprising (i) the video and (ii) the first embedding using a visual speech recognition neural network having a plurality of parameters, wherein the visual speech recognition neural network is configured to process the video and the first embedding in accordance with trained values of the parameters to generate a speech recognition output that defines a sequence of one or more words being spoken by the first speaker in the video.

In some implementations, the visual speech recognition neural network is configured to: generate, from the first embedding, an additional input channel; and combine the additional channel with one or more of the frames in the video prior to processing the frames in the video to generate the speech recognition output.

In some implementations, the visual speech recognition neural network comprises a plurality of hidden layers, and wherein the neural network is configured to, for at least one of the hidden layers: generate, from the first embedding, an additional hidden channel; and combine the hidden channel and an output of the hidden layer prior to providing the output for processing by another hidden layer of the visual speech recognition neural network.

In some implementations, the method further comprises: obtaining adaptation data for the first speaker, the adaptation data comprising one of more videos of the first speaker and a respective ground truth transcription for each of the videos; and determining the first embedding for the first speaker using the adaptation data.

In some implementations, the method further comprises obtaining pre-trained values for the model parameters that have been determined by training the visual speech recognition neural network on training data comprising training examples corresponding to a plurality of speakers that are different from the first speaker, wherein determining the first embedding comprises determining the first embedding using the pre-trained values and the adaptation data.

In some implementations, determining the first embedding comprises: initializing the first embedding; and updating the first embedding by repeatedly performing operations comprising: processing each of one or more of the video segments in the adaptation data and the first embedding using the visual speech recognition neural network in accordance with current values of the parameters to generate a respective speech recognition output for each of the one or more video segments; and updating the first embedding to minimize a loss function that measures, for each of the one or more video segments, a respective error between the ground truth transcription of the video segment and the respective speech recognition output for the video segment.

In some implementations, updating the first embedding to minimize a loss function that measures, for each of the one or more video segments, a respective error between the ground truth transcription of the video segment and the respective speech recognition output for the video segment comprises: backpropagating gradients of the loss function through the visual speech recognition neural network to determine a gradient of the loss function with respect to the first embedding; and updating the first embedding using the gradient of the loss function with respect to the first embedding.

In some implementations, the current values are equal to the pre-trained values and to the trained values and wherein the model parameters are fixed while determining the first embedding.

In some implementations, the operations further comprise: updating the current values of the parameters of the visual speech recognition neural network based on gradients of the loss function with respect to the parameters of the visual speech recognition neural network, and wherein the trained values are equal to the current values after determining the first embedding vector.

In some implementations, the method further comprises: applying a decoder to the speech recognition output for the video to generate the sequence of one or more words being spoken by the first speaker in the video.

In some implementations, the speech recognition output comprises, for each of the video frames, a respective probability distribution over a vocabulary of text elements.

The subject matter described in this specification can be implemented in particular embodiments so as to realize one or more of the following advantages.

An adaptive visual speech recognition model as described in this specification can be used to rapidly adapt to a new speaker using orders of magnitude less data than was used to train the model. This enables the adaptation process to be performed by consumer hardware of end users rather than being performed in a datacenter.

Moreover, multi-speaker visual speech recognition models tend to under-fit a large number of data samples from the training data when being trained on a large dataset that represents videos of multiple speakers. This can be due to small imbalances in the collected video data or even to the finite capacity of any model to capture all the diverse scenarios represented in a large video data set. The described techniques address these issues by first training a speaker-conditional visual speech recognition model that is conditioned on (i) a video of speaker and (ii) an embedding of the speaker, and then adapting the speaker-conditional visual speech recognition model by learning an embedding for a new speaker (and optionally fine-tuning the weights of the model).

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
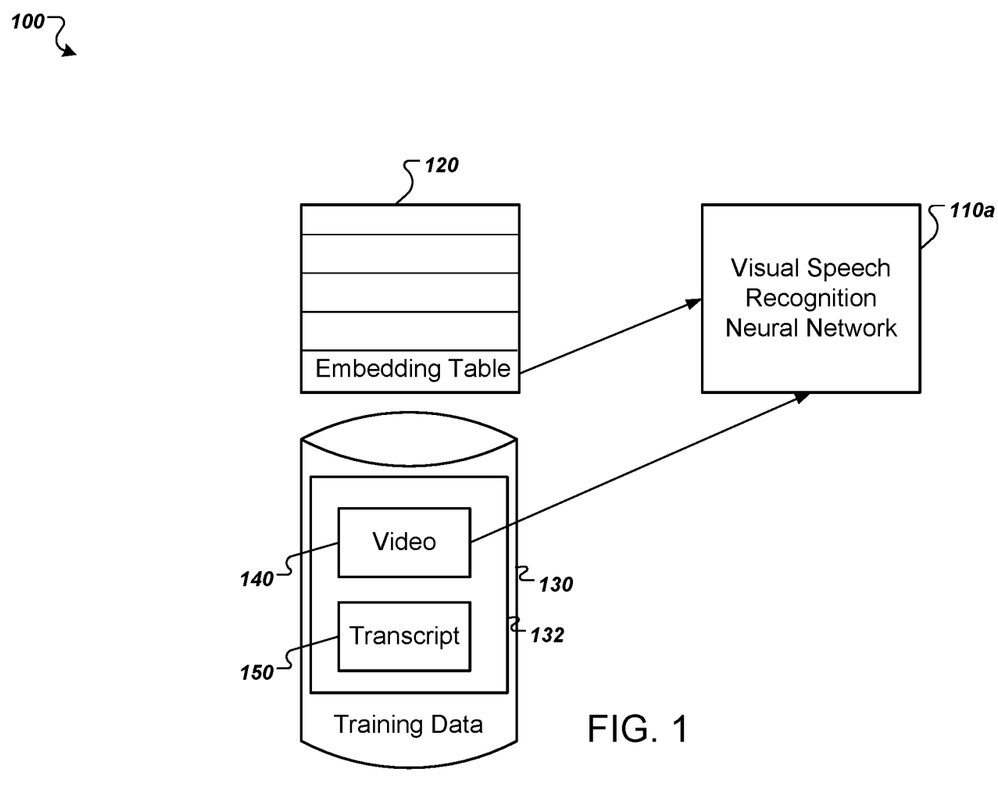
FIG. 1 is a diagram that illustrates an example architecture for training an adaptive visual speech recognition model.

FIG. 1 is a diagram that illustrates an example architecture 100 for training an adaptive visual speech recognition model.

The architecture 100 includes a visual speech recognition neural network 110a that is trained using an embedding table 120 that stores embedding vectors for multiple different respective individual speakers.

The visual speech recognition neural network 110a can be any appropriate visual speech recognition neural network that receives as input a video of a speaker and, as described below, an embedding vector for the speaker and processes the video and the embedding vector to generate as output a speech recognition output that represents a predicted transcription of the speech being spoken by the speaker in the video.

As used in this specification, a "video" includes only a sequence of video frames and not any corresponding audio for the video frame sequence. Thus, the visual speech recognition neural network 110a generates the speech recognition output without having access to any audio data of the speech actually being spoken by the speaker.

One example of a visual speech recognition neural network is a LipNet. LipNets were initially described in Assael et al., LipNet: End-to-End Sentence-Level Lipreading, in arXiv preprint arXiv: 1611.01599 (2016), available at arxiv.org. A LipNet is a deep neural network that maps a variable-length sequence of video frames to text, making use of spatiotemporal convolutions and a recurrent neural network.

Another example of a visual speech recognition neural network is described in Shillingford et al., Large-Scale Visual Speech Recognition, in arXiv preprint arXiv: 1807.05612 (2018), available at arxiv.org. Large-Scale Visual Speech Recognition describes a deep visual speech recognition neural network that maps lip videos to sequences of phoneme distributions, also making use of spatiotemporal convolutions and a recurrent neural network.

Generally, either of the above two visual speech recognition neural network architectures or any other visual speech recognition neural network architecture can be modified to accept an embedding vector as input along with a video that depicts a speaker, e.g., the face of the speaker or just the mouth or lips of the speaker, at each of multiple time steps. The architecture can be modified to process the embedding vector in any of a variety of ways.

As one example, the system can generate an additional input channel using the embedding vector that has the same spatial dimensions as the video frame and then combine the additional channel with the video frames, e.g., by concatenating the additional channel to each video frame along the channel dimension (e.g. as if the input channel were intensity values for a color additional to the colors (e.g. RBG) of the video frames). For example, the system can generate an additional input channel using the embedding vector by applying a broadcast operation to the values in the embedding vector to generate a two-dimensional spatial map that has the same dimensions as the video frames.

As another example, the system can generate an additional hidden channel using the embedding vector that has the same spatial dimensions as the output of a particular one of the hidden layers of the neural network, e.g., as one of the spatiotemporal convolutional layers in the neural network, and then combine the additional hidden channel with the output of the particular hidden layer, e.g., by concatenating the additional channel to the output of the hidden layer along the channel dimension, by adding the additional channel to the output of the hidden layer, by element-wise multiplication of the additional channel with the output of the hidden layer, or by applying a gating mechanism between the output of the hidden layer and the additional channel.

The components illustrated in FIG. 1 can be implemented by a distributed computing system comprising a plurality of computers that coordinate to train the visual speech recognition neural network 110a.

The computing system can train the visual speech recognition neural network 110a on training data 130 that includes multiple training examples 132. Each training example 132 corresponds to a respective speaker and includes (i) a video of the corresponding speaker 140 and (ii) a respective ground truth transcription 150 of the speech that is being spoken by the corresponding speaker in the video.

Each of the speakers that corresponds to one or more of the training examples 132 has a respective embedding vector that is stored in the embedding table 120. An embedding vector is a vector of numeric values, e.g., floating point values or quantized floating point values, that has a fixed dimensionality (number of components).

During training, the embedding vector for a given speaker can be generated in any of a variety of ways.

As one example, the embedding vector can be generated based on one or more characteristics of the speaker.

As a particular example, the computer system can process one or more images of the speaker's face, e.g., cropped from the video of the speaker in the corresponding training example, using an embedding neural network, e.g., a convolutional neural network that has been trained to generate embeddings of faces that can be used to distinguish between people or that reflect other properties of people's faces, to generate a face embedding vector of the face of the speaker. For example, the computer system can process multiple images of the speaker's face using the embedding neural network to generate a respective image embedding vector for each image and then combine, e.g., average, the image embedding vectors to generate the face embedding vector of the face of the speaker.

As another particular example, the computer system can measure certain properties of the speaker's appearance while speaking and map each measured property to a respective property embedding vector, e.g., using a predetermined mapping. One example of such a property is the frequency of mouth openness while speaking. Another example of such a property is a maximum degree of mouth openness while speaking. Yet another example of such a property is an average degree of mouth openness while speaking.

When the system generates respective embedding vectors for each of multiple characteristics of the speaker, e.g., a face embedding vector and one or more respective property embedding vectors, the system can combine, e.g., average, sum, or concatenate, the respective embedding vectors for the multiple characteristics to generate the embedding vector for the speaker.

As another example, the system can randomly initialize each speaker embedding (embedding vector) in the embedding table 120 and then update the speaker embeddings jointly with the training of the neural network 110a.

At each iteration of training, the system samples a mini-batch of one or more training examples 132 and, for each training example 132, processes the respective speaker video 140 in the training example and the embedding vector for the corresponding speaker from the embedding table 120 using the neural network 110a to generate a predicted speech recognition output, e.g., a probability distribution over a set of text elements, e.g., characters, phonemes, or word pieces, for the training example 132.

The system then trains the neural network 110a using a gradient-based technique, e.g., stochastic gradient descent, Adam, or rmsProp, to minimize a loss function that measures, for each training example 132 in the mini-batch, a respective error between the ground truth transcription 150 of the speech for the training example 132 and the predicted speech recognition output for the training example 132. For example, the loss function can be a Connectionist Temporal Classification (CTC) loss function. The CTC loss is described in more detail in Alex Graves, Santiago Fernández, Faustino Gomez, and Jürgen Schmidhuber. Connectionist temporal classification: Labelling unsegmented sequence data with recurrent neural networks. In International Conference on Machine Learning, pp. 369-376, 2006.

In some implementations, the system also updates the embedding vectors for the speaker videos in the mini-batch, e.g., by backpropagating gradients through the neural network 110a and into the appropriate embedding vector. More specifically, when the embedding vectors in the embedding table 120 are initialized randomly, the system also updates the embedding vectors. When the embedding vectors in the embedding table 120 are generated based on characteristics or properties of the corresponding speakers, in some implementations the system holds the embedding vectors fixed during the training while in other implementations, the system fine-tunes the embedding vectors in the embedding table 120 by updating them jointly with the training of the neural network 110a.

After training, to generate a transcription for a new speaker video, the system (or another system) can process as input the new speaker video and a new embedding for the speaker to generate a predicted speech recognition output for the new speaker video. Optionally, the system can then apply a decoder to the predicted speech recognition output, e.g., a beam search decoder or a finite state transducer (FST)-based decoder, to map the speech recognition output to a sequence of words.

However, while at training time the embeddings are generated using characteristics of the speaker, these characteristics will generally not be available for a new speaker. Thus, the system can adapt the trained neural network 110a to the new speaker before using the trained neural network 110a to generate transcriptions for the new speaker.

Figure 2:
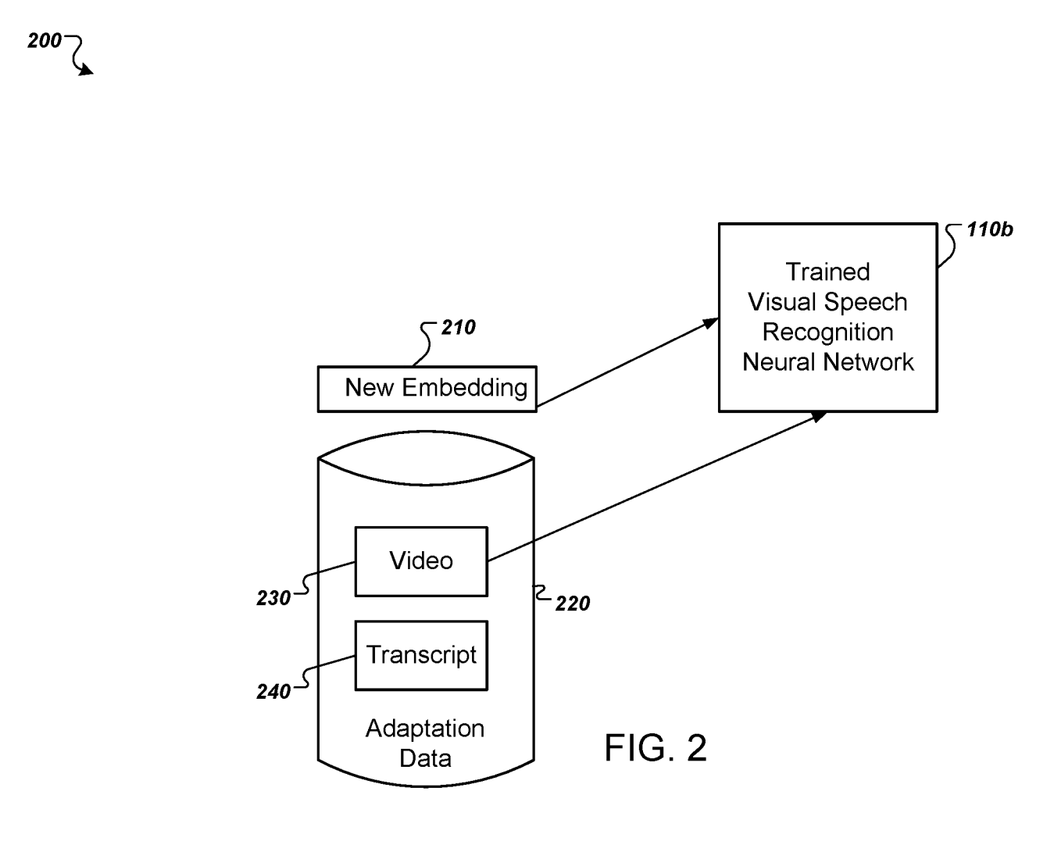
FIG. 2 is a diagram that illustrates an example architecture for adapting an adaptive visual speech recognition model to a new individual speaker.

FIG. 2 is a diagram that illustrates an example architecture 200 for adapting an adaptive visual speech recognition model to a new individual speaker. During the adaptation process, the embedding of the new speaker is adjusted so that the neural network 110a is adapted to a particular individual's characteristics. In other words, the purpose of the training process illustrated in FIG. 1 is to learn a prior. During adaptation, this prior is combined with new data to rapidly adapt to a new speaker's characteristics.

Typically, the training process illustrated in FIG. 1 is performed on a distributed computing system having multiple computers. And as described above, the adaptation process can be performed on much less computationally expensive hardware, e.g., a desktop computer, laptop computer, or mobile computing device. For convenience, the adaptation process will be discussed as being performed by a system of one or more computers.

The architecture 200 includes a visual speech recognition neural network 110b, e.g., corresponding to a trained version of the visual speech recognition neural network 110a that has been trained using the process described above with reference to FIG. 1.

To adapt the model to the new individual speaker, the system uses adaptation data 220 representing a set of videos 230 ("video segments") of the new individual speaker speaking and corresponding transcriptions 240 of the text being spoken in each video. For example, each video 230 can be a video of the speaker taken while the speaker speaks the text that is written on a text prompt or that is otherwise being presented to the user on a user device.

Generally the adaptation data 220 used for the adaptation process can be orders of magnitude smaller than the training data 130 used for the training process. In some implementations, the training data 130 includes multiple hours of video recordings for each individual speaker of the plurality of different individual speakers, while the adaptation process 220 can use less than ten minutes of video recordings of the new individual speaker.

In addition, the adaptation process is generally much less computationally intensive than the training process. Thus, as indicated above, in some implementations the training process is performed in a datacenter having tens or hundreds or thousands of computers, while the adaptation process is performed on a mobile device or a single, Internet-enabled device.

To begin the adaptation phase, the system can initialize a new embedding vector 210 for the new speaker. Generally, the new embedding vector 210 can be different from any of the embedding vectors used during the training process.

For example, the system can initialize the new embedding vector 210 randomly or using any available data that characterizes the new speaker. In particular, the system can initialize the new embedding vector 210 randomly or from the adaptation data 220 using one of the techniques described above for generating the speaker embeddings in the table 120. Even when one of the techniques described above for generating embeddings using characteristics of the speaker is used, because the adaptation data 220 generally has less data than is available in the training data for any given speaker, the newly generated embedding vector 210 will generally be less informative about the speech of the speaker than the speaker embedding vectors used during training.

The adaptation process can be performed in multiple ways. In particular, the system can use a non-parametric technique or a parametric technique.

The non-parametric technique involves adapting the new speaker embedding 210 and, optionally, the model parameters of the neural network 110b, or both, using the adaptation data 220.

In particular, when performing the non-parametric technique, at each iteration of the adaptation phase, the system processes one or more video segments 230 in the adaptation data 220 and the current embedding vector 210 for the new speaker using the neural network 110b to generate a predicted speech recognition output for each video segment 230.

The system then updates the embedding vector 210 by backpropagating a gradient of a loss, e.g., the CTC loss, between the ground truth transcription 240 of the video segment 230 and the predicted speech recognition output for the video segment 230 through the neural network 110b to compute a gradient with respect to the embedding vector 210 and then updates the embedding vector 210 using an update rule, e.g., a stochastic gradient descent update rule, an Adam update rule, or an rmsProp update rule.

In some of these cases, the system holds the values of the model parameters of the neural network 110b fixed during the adaptation phase. In others of these cases, the system also updates the model parameters at each iteration of the adaptation phase, e.g., by using the gradient-based technique to update the model parameters using the same loss used to update the embedding vector 210.

Alternatively, the system can use a parametric technique that involves training an auxiliary network to predict the embedding vector of a new speaker using a set of demonstration data, e.g., a set of videos that is different from those in the training data used to train the neural network 110b. The trained auxiliary neural network can then be used to predict the embedding vector 210 for the new speaker given the speaker's adaptation data 220.

Figure 3:
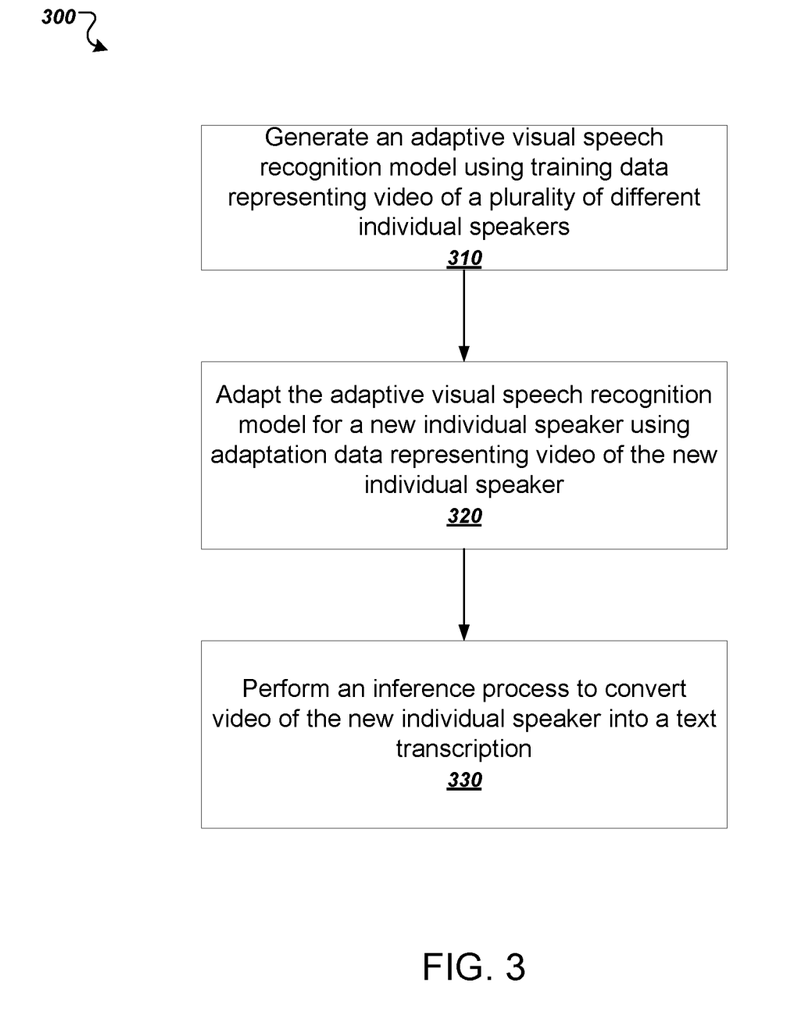
FIG. 3 is a flowchart of an example process for generating and using an adaptive visual speech recognition model.

FIG. 3 is a flowchart of an example process 300 for generating and using an adaptive visual speech recognition model. As described above, the process includes three stages: training, adaptation, and inference.

Typically, the training stage is performed on a distributed computing system having multiple computers.

And, as described above, the other two stages can be performed on much less computationally expensive hardware, e.g., a desktop computer, laptop computer, or mobile computing device.

For convenience, the example process 300 will be described as being performed by a system of one or more computers, but it will be understood that different steps of the process 300 can be performed by different computing devices having different hardware capabilities.

The system generates an adaptive visual speech recognition model using training data representing video of speech by a plurality of different individual speakers (310). As described above with reference to FIG. 1, the system can generate different embedding vectors for a plurality of individual speakers. The system can then train parameter values of a neural visual speech recognition model using training data that includes text and video data representing a plurality of different individual speakers speaking portions of text. Each of the embedding vectors generally represents respective characteristics of one of the plurality of different individual speakers.

The system adapts the adaptive visual speech recognition model for a new individual speaker using adaptation data representing video of speech being spoken by the new individual speaker (320). As described above with reference to FIG. 2, the adaptation process uses video data representing the new individual speaker speaking portions of text.

During the adaptation phase, the system can generate a new embedding vector for the new speaker using the adaptation data and, optionally, fine-tune the model parameters of the trained visual speech recognition neural network.

After adaptation, the system performs an inference process to convert video of a new speaker and the embedding of the new speaker into a transcription of the text being spoken in the video (330). In general, the system uses the visual speech recognition model adapted for the new individual speaker, which includes using as input the new embedding vector for the individual speaker determined during the adaptation phase and a new video. As described above, the system can generate the transcription as a sequence of words and, in some cases, punctuation by applying a decoder to the speech recognition outputs generated by the adapted visual speech recognition model. Performing inference can also include can also include one or more of: displaying the transcription in a user interface, or translating the transcription into another language, or providing audio data representing a verbalization of the transcription for play back on one or more audio devices.

While this description above describes adaptive visual speech recognition, the described techniques can also be applied to generate an adaptive audio-visual speech recognition model, where the input to the model is a video sequence of a speaker speaking and a corresponding audio sequence of the speaker speaking (although the two may not be temporally aligned with one another) and an embedding of the speaker, and the output is a transcription of the text being spoken in the audio-video pair. An example of an audio-visual speech recognition model that can be modified to accept an embedding as input and can be adapted as described above is described in Makino, et al, Recurrent Neural Network Transducer for Audio-Visual Speech Recognition, in arXiv preprint arXiv: 1911.04890 (2019), available at arxiv.org. When the input also includes audio data, the speaker embedding can also or instead be generated using the audio data, e.g., by processing the audio using an audio embedding neural network that has been trained to generate embeddings that uniquely identify speakers.

The proposed adaptive visual speech recognition model, or audio-visual speech recognition model, is useful for example for a user with impaired hearing, to generate text representing what the new speaker says so that the user can read it. In another example, the user may be the new speaker, and the visual speech recognition model, or audio-visual speech recognition model, may be used in a dictation system to generate text, or in a control system to generate textual commands which are implemented by another system, such as an electronic system or an electro-mechanical system. The adaptive visual speech recognition model may be implemented to perform steps 320 and/or 330 by a computer system which comprises at least one video camera for capturing the video of the new speaker which is processed in steps 320 and/or 330. In the case of an audio-visual speech recognition model, the video camera may comprise a microphone for capturing the audio track which accompanies the captured video.

In situations in which the systems discussed here make use of data potentially including personal information, that data may be treated in one or more ways, such as aggregation and anonymization, before it is stored or used so that such personal information cannot be determined from the data that is stored or used. Furthermore, the use of such information may be such that no personally identifiable information may be determined from the output of the systems that use such information.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, e.g., inference, workloads.

Machine learning models can be implemented and deployed using a machine learning framework, e.g., a TensorFlow framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method performed by one or more computers, the method comprising:
   receiving a video that includes a plurality of video frames that depict a first speaker;
   obtaining a first embedding characterizing the first speaker, comprising:
      obtaining adaptation data for the first speaker, the adaptation data comprising one or more adaptation videos of the first speaker and a respective ground truth transcription for each of the one or more adaptation videos, and
      determining the first embedding for the first speaker using the adaptation data by minimizing a loss function that measures, for each of the one or more adaptation videos, a respective error between the ground truth transcription of the adaptation video and a respective speech recognition output for the adaptation video; and
   processing a first input comprising (i) the video and (ii) the first embedding using a visual speech recognition neural network having a plurality of parameters, wherein the visual speech recognition neural network is configured to process the video and the first embedding in accordance with trained values of the parameters to generate a speech recognition output that defines a sequence of one or more words being spoken by the first speaker in the video.

2. The method of claim 1, wherein the visual speech recognition neural network is configured to:
   generate, from the first embedding, an additional input channel; and
   combine the additional channel with one or more of the frames in the video prior to processing the frames in the video to generate the speech recognition output.

3. The method of claim 1, wherein the visual speech recognition neural network comprises a plurality of hidden layers, and wherein the neural network is configured to, for at least one of the hidden layers:
   generate, from the first embedding, an additional hidden channel; and
   combine the hidden channel and an output of the hidden layer prior to providing the output for processing by another hidden layer of the visual speech recognition neural network.

4. The method of claim 1, further comprising:
   obtaining pre-trained values for the model parameters that have been determined by training the visual speech recognition neural network on training data comprising training examples corresponding to a plurality of speakers that are different from the first speaker, wherein determining the first embedding comprises determining the first embedding using the pre-trained values and the adaptation data.

5. The method of claim 4, wherein determining the first embedding comprises:
   initializing the first embedding; and
   updating the first embedding by repeatedly performing operations comprising:
      processing each of one or more of the adaptation videos in the adaptation data and the first embedding using the visual speech recognition neural network in accordance with current values of the parameters to generate a respective speech recognition output for each of the one or more adaptation videos; and
      updating the first embedding to minimize the loss function.

6. The method of claim 5, wherein updating the first embedding to minimize the loss function comprises:
   backpropagating gradients of the loss function through the visual speech recognition neural network to determine a gradient of the loss function with respect to the first embedding; and
   updating the first embedding using the gradient of the loss function with respect to the first embedding.

7. The method of claim 5, wherein the current values are equal to the pre-trained values and to the trained values and wherein the model parameters are fixed while determining the first embedding.

8. The method of claim 5, wherein the operations further comprise:
   updating the current values of the parameters of the visual speech recognition neural network based on gradients of the loss function with respect to the parameters of the visual speech recognition neural network, and wherein the trained values are equal to the current values after determining the first embedding vector.

9. The method of claim 1, further comprising:
   applying a decoder to the speech recognition output for the video to generate the sequence of one or more words being spoken by the first speaker in the video.

10. The method of claim 1, wherein the speech recognition output comprises, for each of the video frames, a respective probability distribution over a vocabulary of text elements.

11. One or more non-transitory computer-readable storage media storing instructions that when executed by one or more computers cause the one or more computers to perform operations comprising: receiving a video that includes a plurality of video frames that depict a first speaker; obtaining a first embedding characterizing the first speaker, comprising: obtaining adaptation data for the first speaker, the adaptation data comprising one or more adaptation videos of the first speaker and a respective ground truth transcription for each of the one or more adaptation videos, and determining the first embedding for the first speaker using the adaptation data by minimizing a loss function that measures, for each of the one or more adaptation videos, a respective error between the ground truth transcription of the adaptation video and a respective speech recognition output for the adaptation video; and processing a first input comprising (i) the video and (ii) the first embedding using a visual speech recognition neural network having a plurality of parameters, wherein the visual speech recognition neural network is configured to process the video and the first embedding in accordance with trained values of the parameters to generate a speech recognition output that defines a sequence of one or more words being spoken by the first speaker in the video.

12. A system comprising one or more computers and one or more storage devices storing instructions that when executed by the one or more computers cause the one or more computers to perform operations comprising:
   receiving a video that includes a plurality of video frames that depict a first speaker;
   obtaining a first embedding characterizing the first speaker, comprising:
      obtaining adaptation data for the first speaker, the adaptation data comprising one or more adaptation videos of the first speaker and a respective ground truth transcription for each of the one or more adaptation videos, and
      determining the first embedding for the first speaker using the adaptation data by minimizing a loss function that measures, for each of the one or more adaptation videos, a respective error between the ground truth transcription of the adaptation video and a respective speech recognition output for the adaptation video; and processing a first input comprising (i) the video and (ii) the first embedding using a visual speech recognition neural network having a plurality of parameters, wherein the visual speech recognition neural network is configured to process the video and the first embedding in accordance with trained values of the parameters to generate a speech recognition output that defines a sequence of one or more words being spoken by the first speaker in the video.

13. The system of claim 12, wherein the visual speech recognition neural network is configured to:
generate, from the first embedding, an additional input channel; and
combine the additional channel with one or more of the frames in the video prior to processing the frames in the video to generate the speech recognition output.

14. The system of claim 12, wherein the visual speech recognition neural network comprises a plurality of hidden layers, and wherein the neural network is configured to, for at least one of the hidden layers:
generate, from the first embedding, an additional hidden channel; and
combine the hidden channel and an output of the hidden layer prior to providing the output for processing by another hidden layer of the visual speech recognition neural network.

15. The system of claim 12, the operations further comprising:
obtaining pre-trained values for the model parameters that have been determined by training the visual speech recognition neural network on training data comprising training examples corresponding to a plurality of speakers that are different from the first speaker, wherein determining the first embedding comprises determining the first embedding using the pre-trained values and the adaptation data.

16. The system of claim 15, wherein determining the first embedding comprises:
initializing the first embedding; and
updating the first embedding by repeatedly performing updating operations comprising:
processing each of one or more of the adaptation videos in the adaptation data and the first embedding using the visual speech recognition neural network in accordance with current values of the parameters to generate a respective speech recognition output for each of the one or more adaptation videos; and
updating the first embedding to minimize the loss function.

17. The system of claim 16, wherein updating the first embedding to minimize the loss function comprises:
backpropagating gradients of the loss function through the visual speech recognition neural network to determine a gradient of the loss function with respect to the first embedding; and
updating the first embedding using the gradient of the loss function with respect to the first embedding.

18. The system of claim 16, wherein the current values are equal to the pre-trained values and to the trained values and wherein the model parameters are fixed while determining the first embedding.

19. The system of claim 16, wherein the updating operations further comprise:
updating the current values of the parameters of the visual speech recognition neural network based on gradients of the loss function with respect to the parameters of the visual speech recognition neural network, and wherein the trained values are equal to the current values after determining the first embedding vector.

20. The system of claim 12, the operations further comprising:
applying a decoder to the speech recognition output for the video to generate the sequence of one or more words being spoken by the first speaker in the video.

* * * * *